United States Patent
Yu et al.

(10) Patent No.: US 9,871,271 B2
(45) Date of Patent: *Jan. 16, 2018

(54) NON-AQUEOUS ELECTROLYTE AND LITHIUM SECONDARY BATTERY USING THE SAME

(71) Applicant: LG Chem, Ltd., Seoul (KR)

(72) Inventors: Sung-Hoon Yu, Daejeon (KR); Doo Kyung Yang, Daejeon (KR); Min-Jung Jou, Daejeon (KR); Yoo-Seok Kim, Daejeon (KR); Yoo-Sun Kang, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/887,655

(22) Filed: May 6, 2013

(65) Prior Publication Data

US 2013/0252113 A1 Sep. 26, 2013

Related U.S. Application Data

(63) Continuation of application No. PCT/KR2012/005729, filed on Jul. 18, 2012.

(30) Foreign Application Priority Data

Jul. 18, 2011 (KR) .................. 10-2011-0071060
Jul. 18, 2012 (KR) .................. 10-2012-0078056

(51) Int. Cl.
*H01M 10/0569* (2010.01)
*H01M 10/0567* (2010.01)
*H01M 10/052* (2010.01)

(52) U.S. Cl.
CPC ..... *H01M 10/0569* (2013.01); *H01M 10/052* (2013.01); *H01M 10/0567* (2013.01);
(Continued)

(58) Field of Classification Search
None
See application file for complete search history.

(56) References Cited

U.S. PATENT DOCUMENTS 5,731,106 A * 3/1998 Tsutsumi et al. ............. 429/332
7,220,519 B2    5/2007 Roh et al.
(Continued)

FOREIGN PATENT DOCUMENTS

CN    101540419 A    9/2009
EP    2224532 A1     9/2010
(Continued)

OTHER PUBLICATIONS

"Ethylene carbonate", "4-Fluoro-1,3-dioxolan-2-one", "1,3-Dioxan-2-one", "Vinylene carbonate" from chemBlink.com. Accessed on: Jul. 9, 2014. <http://www.chembilnk.com>.*
(Continued)

*Primary Examiner* — Barbara L Gilliam
*Assistant Examiner* — Robert S Carrico
(74) *Attorney, Agent, or Firm* — Lerner, David, Littenberg, Krumholz & Mentlik, LLP (57) ABSTRACT

The present invention provides non-aqueous electrolyte solution for a lithium secondary battery, comprising a pyrimidine-based compound, a non-fluorinated solvent and a fluorinated solvent; and a lithium secondary battery using the same.

6 Claims, 2 Drawing Sheets (52) U.S. Cl.
CPC ............... *H01M 2300/004* (2013.01); *H01M 2300/0034* (2013.01); *H01M 2300/0037* (2013.01); *H01M 2300/0042* (2013.01)

(56) References Cited

U.S. PATENT DOCUMENTS

| | | | |
|---|---|---|---|
| 2003/0165733 A1* | 9/2003 | Takehara et al. | 429/101 |
| 2003/0232244 A1 | 12/2003 | Birke et al. | |
| 2004/0197667 A1* | 10/2004 | Noh | H01M 10/0525 |
| | | | 429/326 |
| 2005/0019670 A1* | 1/2005 | Amine et al. | 429/326 |
| 2005/0042519 A1 | 2/2005 | Roh et al. | |
| 2005/0118512 A1* | 6/2005 | Onuki et al. | 429/326 |
| 2008/0199773 A1* | 8/2008 | Deguchi | H01M 2/166 |
| | | | 429/188 |
| 2009/0053599 A1 | 2/2009 | Ichihashi et al. | |
| 2010/0028785 A1 | 2/2010 | Choi et al. | |
| 2010/0099031 A1* | 4/2010 | Kato et al. | 429/330 |
| 2010/0119956 A1 | 5/2010 | Tokuda et al. | |
| 2011/0008681 A1* | 1/2011 | Koh et al. | 429/331 |
| 2011/0045361 A1* | 2/2011 | Abe et al. | 429/343 |
| 2011/0076572 A1 | 3/2011 | Amine et al. | |
| 2012/0171581 A1* | 7/2012 | Abe et al. | 429/339 |

FOREIGN PATENT DOCUMENTS

| | | | |
|---|---|---|---|
| EP | 2736113 A2 | | 5/2014 |
| JP | 09213348 A | * | 8/1997 |
| JP | H9-204932 | | 8/1997 |
| JP | H10-79262 A | | 3/1998 |
| JP | H10-189008 A | | 7/1998 |
| JP | 2002083631 A | * | 3/2002 ............ H01M 10/40 |
| JP | 2002-298912 A | | 10/2002 |
| JP | 2003-331923 A | | 11/2003 |
| JP | 2008-204788 A | | 9/2008 |
| JP | 2009026675 A | | 2/2009 |
| KR | 20040037534 A | | 5/2004 |
| KR | 20050019478 A | | 3/2005 |
| WO | 01/29920 A1 | | 4/2001 |
| WO | 2004040687 A1 | | 5/2004 |
| WO | 2006088002 A1 | | 8/2006 |
| WO | 2008078626 A1 | | 7/2008 |
| WO | WO 2009035085 A1 * | | 3/2009 ............ H01M 10/40 4/48 |
| WO | WO 2009122908 A1 * | | 10/2009 ............ H01M 10/40 |
| WO | WO 2011034067 A1 * | | 3/2011 ......... H01M 10/0567 |
| WO | 2011043403 A1 | | 4/2011 |

OTHER PUBLICATIONS

"Ehtyl methyl carbonate", "Dimethyl carbonate" from CRC Handbook of Chemistry and Physics (Internet Version 2014): Physical Constants of Organic Compounds. Accessed on: Jul. 9, 2014. <http://www.hbcpnetbase.com>.*
Machine translation for Fukunaga et al., JP 2002-083631 A.*
Machine translation for Kusumoto et al., JP 09-213348 A.*
International Search Report dated Jan. 29, 2013 for Application No. PCT/KR2012/005729.

* cited by examiner

NON-AQUEOUS ELECTROLYTE AND LITHIUM SECONDARY BATTERY USING THE SAME

CROSS-REFERENCE TO RELATED APPLICATION

This application is a continuation of International Application No. PCT/KR2012/005729 filed on Jul. 18, 2012, which claims priority under 35 USC 119(a) to Korean Patent Application No. 10-2011-0071060 filed in the Republic of Korea on Jul. 18, 2011, and Korean Patent Application No. 10-2012-0078056 filed in the Republic of Korea on Jul. 18, 2012, the entire contents of which are incorporated herein by reference.

TECHNICAL FIELD

The present invention relates to a non-aqueous electrolyte solution for a lithium secondary battery, which comprises a non-fluorinated solvent, a fluorinated solvent and a pyrimidine-based compound, and a lithium secondary battery using the same.

BACKGROUND ART

Recently, there has been growing interest in energy storage technologies. As energy storage technologies are extended to devices such as cellular phones, camcorders and notebook PC, and further to electric vehicles, demand for high energy density of batteries used as a source of power supply of such devices is increasing. Therefore, research and development of lithium secondary batteries, which most meet the demand, are actively being conducted.

Among secondary batteries currently used, a lithium secondary battery developed in the early 1990's comprises an anode made of carbon material capable of intercalating or disintercalating lithium ions, a cathode made of lithium-containing oxide, and a non-aqueous electrolyte solution obtained by dissolving a suitable amount of lithium salt in a mixed organic solvent.

The lithium secondary battery has an average discharge voltage of about 3.6 to 3.7V, which is advantageously higher than those of other batteries such as alkali batteries or nickel-cadmium batteries. In order to provide such a high operation voltage, an electrolyte composition electrochemically stable in a charging/discharging voltage range of 0 to 4.2 V is required. For this purpose, a mixed solvent in which a cyclic carbonate compound such as ethylene carbonate and propylene carbonate, and a linear carbonate compound such as dimethyl carbonate, ethyl methyl carbonate and diethyl carbonate are suitably mixed to be used as a solvent of the electrolyte solution. A typical electrolyte solution uses lithium salt such as $LiPF_6$, $LiBF_4$ and $LiClO_4$ as solutes, which acts as a source for supplying lithium ions in a battery and thus enables the lithium battery to operate.

During the initial charging process of the lithium secondary battery, lithium ions emitted from a cathode active material such as a lithium-metal oxide is transferred into an anode active material such as graphite and inserted between the layers of the anode active material, at which high reactive lithium reacts with the electrolyte solution and carbon present in the anode active material on the surface of the anode active material such as graphite to produce a compound such as $Li_2CO_3$, $Li_2O$ and $LiOH$. The produced compound forms a kind of a solid electrolyte interface (SEI) layer on the surface of the anode active material such as graphite.

The SEI layer functions as an ion tunnel, allowing only lithium ions to pass through. As an effect of such an ion tunnel, the SEI layer prevents the molecule of an organic solvent having large molecular weight, which is included in the electrolyte solution and transferred together with lithium ions, from being inserted between the layers of the anode active material to destroy the structure of the anode. As a result, direct contact of the electrolyte solution with the anode active material is prohibited to prevent the decomposition of the electrolyte solution and reversibly maintains the amount of lithium ions present in the electrolyte solution, thereby allowing a stable charging/discharging.

However, during the formation of the SEI layer, the carbonate-based organic solvent may decompose to generate a gas such as CO, $CO_2$, $CH_4$ and $C_2H_6$, which may cause the battery being charged to swell in thickness. Also, when a battery is left at a high temperature in a fully charged state, the SEI layer may be slowly broken down due to increased electrochemical energy and thermal energy over time, thereby causing continuous side reactions between the surface of the anode and the surrounding electrolyte solution and continuously generating gas. As a result, the inner pressure of the battery may be increased, thereby increasing the thickness of the battery to cause performance problems to electronics such as cellular phones and notebook computers equipped with the battery. Thus, the SEI layer has poor stability at a high temperature. In addition, in conventional lithium secondary batteries comprising a large amount of ethylene carbonate, the unstableness of the SEI layer may intensify the inner pressure increase problem of the battery. Furthermore, ethylene carbonate has a high freezing point (37 to 39° C.) and maintains a solid state at room temperature to have low ionic conductivity at a low temperature. Accordingly, a lithium battery using a non-aqueous solvent containing a large amount of ethylene carbonate has a poor conductivity at a low temperature.

In order to overcome such a problem, attempt has been made to vary the composition of a carbonate-based organic solvent or mix the solvent with a certain additive to change a SEI layer-forming reaction. However, it is known that the variation of a solvent composition or the addition of a certain compound may improve some performances of a battery, but may also deteriorate any other properties thereof.

Accordingly, there is a need to develop a composition of a non-aqueous electrolyte solution capable of providing a lithium battery having superior characteristics in terms of life cycle, low and high temperature discharging, as well as high-rate charging/discharging characteristic.

DISCLOSURE

Technical Problem

The present invention is designed to solve the problems of the prior art, and therefore it is an object of the present invention to provide a non-aqueous electrolyte solution for a lithium secondary battery having an improved life cycle at room temperature and a high temperature, and a lithium secondary battery comprising the non-aqueous electrolyte solution.

Technical Solution

In order to accomplish the above object, in accordance with one aspect of the present invention, there is provided a non-aqueous electrolyte solution for a lithium secondary battery, comprising an electrolyte salt and an organic solvent, wherein the non-aqueous electrolyte solution further comprises a pyrimidine-based compound of the following formula (I), the organic solvent comprises a non-fluorinated solvent and a fluorinated solvent, and the amount of fluorine (F) present in the organic solvent is in the range of 0.1 to 50 wt %:

(I)

wherein, $R_1$ to $R_4$ are each independently hydrogen, substituted or unsubstituted alkyl group having 1 to 10 carbon atoms, or substituted or unsubstituted alkoxy group having 1 to 10 carbon atoms.

The amount of the pyrimidine-based compound may be in the range of 0.1 to 20 parts by weight, based on 100 parts by weight of the organic solvent.

The pyrimidine-based compound may be at least one selected from the group consisting of pyrimidine, 2-methylpyrimidine, 4-methylpyrimidine, 5-methyl pyrimidine, 4,6-dimethylpyrimidine, 4.6-dimethoxy pyrimidine, 2-ethyl pyrimidine, 4-ethyl pyrimidine, 5-ethyl pyrimidine, 4,6-diethyl pyrimidine, 2-methoxy pyrimidine, 4-methoxy pyrimidine, 5-methoxy pyrimidine, 2-ethoxy pyrimidine, 4-ethoxy pyrimidine and 5-ethoxy pyrimidine.

The fluorinated solvent may be selected from the group consisting of a fluorine-containing aromatic solvent, a fluorine-containing cyclic carbonate solvent, a fluorine-containing linear carbonate solvent, a fluorine-containing ester solvent, a fluorine-containing ether solvent, a fluorine-containing nitrile solvent, a fluorine-containing sulfur-based solvent and a mixture thereof.

The fluorine-containing aromatic solvent may be selected from the group consisting of fluorobenzene, 1,2-difluorobenzene, 1,2,3-trifluorobenzene, 1,2,3,4-tetrafluorobenzene, pentafluorobenzene, hexafluorobenzene, 2-fluorotoluene, α,α,α-trifluorotoluene, 3-fluorotoluene, 4-fluorotoluene, 2,3-difluorotoluene, 2,4-difluorotoluene, 2,5-difluorotoluene, 3-fluoro-o-xylene, 4-fluoro-o-xylene, 2-fluoro-m-xylene, 4-fluoro-m-xylene, 2-fluoro-p-xylene and a mixture thereof.

The fluorine-containing cyclic carbonate solvent may be selected from the group consisting of fluoroethylene carbonate, difluoroethylene carbonate, trifluoroethylene carbonate, tetrafluoroethylene carbonate, 3,3,3-trifluoropropylene carbonate, 1-fluoropropylene carbonate and a mixture thereof.

The fluorine-containing linear carbonate solvent may be selected from the group consisting of di-(2,2,2-trifluoroethyl) carbonate, 2,2,2-trifluoroethylmethyl carbonate, fluoromethylmethyl carbonate, difluoromethylmethyl carbonate, trifluoromethylmethyl carbonate, fluoromethylethyl carbonate, difluoromethylethyl carbonate, trifluoromethylethyl carbonate, 1-fluoroethylmethyl carbonate and a mixture thereof.

The fluorine-containing ester solvent may be selected from the group consisting of α-fluoro-γ-butyrolactone, β-fluoro-γ-butyrolactone, α,α-difluoro-γ-butyrolactone, β,β-difluoro-γ-butyrolactone, α-fluoro-γ-valerolactone, β-fluoro-γ-valerolactone, α,α-difluoro-γ-valerolactone, α-fluoro-δ-valerolactone, fluoro-δ-valerolactone and a mixture thereof.

The electrolyte salt may be a lithium salt.

The lithium salt may have an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-fluorinated solvent may be selected from the group consisting of a linear carbonate, a cyclic carbonate, an ether, an ester, an amide and a mixture thereof.

In accordance with another aspect of the present invention, there is provided a lithium secondary battery comprising an electrode assembly consisting of a cathode, an anode and a separator interposed therebetween, and a non-aqueous electrolyte solution introduced in the electrode assembly, wherein the non-aqueous electrolyte solution is the above non-aqueous electrolyte solution for a lithium secondary battery.

The anode may have an anode active material layer comprising lithium metal, a carbon-based material, a metal compound or a mixture thereof.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba, or a mixture thereof.

The cathode may have a cathode layer comprising a lithium-containing oxide.

The lithium-containing oxide may be a lithium-containing transition metal oxide.

The lithium-containing transition metal oxide may be selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}Mn_yO_2$, $LiNi_{1-y}Mn_yO_2$ (0≤y≤1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (0<z<2), $LiCoPO_4$, $LiFePO_4$ and a mixture thereof.

Advantageous Effects

The non-aqueous electrolyte solution according to one aspect of the present invention, which comprises a fluorinated solvent, a non-fluorinated solvent and a pyrimidine-based compound, is used in a lithium secondary battery to minimize the capacity decrease and provide a markedly improved life characteristics and stability even if charging/discharging cycles are repeated several hundred times at room temperature and a high temperature.

DESCRIPTION OF DRAWINGS

Other objects and aspects of the present disclosure will become apparent from the following descriptions of the embodiments with reference to the accompanying drawings in which.

BEST MODE

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

The non-aqueous electrolyte solution for a lithium secondary battery according to one aspect of the present invention comprises an electrolyte salt and an organic solvent, and further comprises a pyrimidine-based compound of the following formula (I), the organic solvent comprises a non-fluorinated solvent and a fluorinated solvent, and the amount of fluorine (F) present in the organic solvent is in the range of 0.1 to 50 wt %:

(I)

wherein, $R_1$ to $R_4$ are each independently hydrogen, substituted or unsubstituted alkyl group having 1 to 10 carbon atoms, or substituted or unsubstituted alkoxy group having 1 to 10 carbon atoms.

The above-mentioned substituents have specific meanings as follows:

The term "alkyl group" used herein refers to a straight- or branched-chain saturated monohydric hydrocarbon moiety having 1 to 10 carbon atoms, preferably 1 to 8 carbon atoms, more preferably 1 to 4 carbon atoms. Examples of unsubstituted alkyl group include methyl, ethyl, propyl, hexyl and the like. In the alkyl group, at least one hydrogen contained therein may be optionally substituted with halogen, hydroxyl, —SH, nitro, cyano, substituted or unsubstituted amino (such as —$NH_2$, —NH(R) and —N(R')(R"), wherein R' and R" are each independently $C_{1-10}$ alkyl), amidino, hydrazine, hydrazone, carboxyl, sulfonic acid, phosphoric acid, $C_{1-20}$ alkyl, halogenated $C_{1-20}$ alkyl, $C_{1-20}$ alkenyl, $C_{1-20}$ alkynyl, $C_{1-20}$ heteroalkyl, $C_{6-20}$ aryl, $C_{6-20}$ arylalkyl, $C_{6-20}$ heteroaryl, or $C_{6-20}$ heteroarylalkyl.

The term "alkoxy group" used herein refers to a straight- or branched-chain saturated oxygen-containing hydrocarbon moiety having 1 to 10 carbon atoms, preferably 1 to 8 carbon atoms, more preferably 1 to 4 carbon atoms. Examples of unsubstituted alkoxy group include methoxy, ethoxy, propoxy, butoxy and t-butoxy. The alkoxy group may further be substituted with at least one halogen atom such as F, Cl and Br to provide haloalkoxy group, for example, fluoromethoxy, chloromethoxy, trifluoromethoxy, trifluoroethoxy, fluoroethoxy and fluoropropoxy. In the alkoxy group, at least one hydrogen may be optionally substituted with substituents as mentioned in the definition of the alkyl group.

In the organic solvent, the fluorinated solvent comprises fluorine having a strong electron-attracting function, thereby allowing the formation of an SEI layer having a high dielectric rate in the initial charging of a battery, good lithium-ion conductivity and good durability. Accordingly, when the fluorinated solvent is added to a non-aqueous electrolyte solution as an additive, a secondary battery using such a non-aqueous electrolyte solution can have high-rate life characteristics and high-capacity charging characteristics per unit of time.

In a secondary battery in which a non-aqueous electrolyte solution is introduced, an anode is subject to rapid shrinking-swelling as the charging/discharging cycles of the battery are repeated, at which an SEI layer is destroyed due to the anode swelling during charging, and the electrolyte solution decomposes to form a new SEI layer. From this phenomenon, the electrolyte is gradually depleted to exhaust lithium ions present in the electrolyte solution as the cycles proceed, thereby decreasing the capacity of the battery.

Accordingly, the non-aqueous electrolyte solution according to one aspect of the present invention comprises a pyrimidine-based compound of formula (I) so as to minimize the capacity decrease of a battery and remarkably improve life characteristics. Specifically, the pyrimidine-based compound can react with an anode first prior to a fluorinated solvent as well as a conventional non-fluororinated solvent used in an electrolyte solution, to form a stable and dense film on the surface of the anode, thereby inhibiting the continuous decomposition reaction between the fluorinated solvent and the anode. Accordingly, the pyrimidine-based compound can be used together with the fluorinated solvent to improve battery characteristics, as compared to the use of only the fluorinated solvent.

That is, the pyrimidine-based compound forms a polymerizable film on the surface of an anode, and due to the nitrogen atom of the polymerizable film having high electron-density, the polymerizable film exhibits good trapping of a metal cation. Accordingly, a metal cation having low electron-density can be trapped between the polymerizable film and a film on an electrode which is in contact with the polymerizable film. As a result, this allows to inhibit a metal cation generated from a cathode active material layer from leaching as a metal on the surface of the anode.

Thus, from the trapping-effect of a metal cation of the pyrimidine-based compound, discharge rate characteristics under the condition of high-temperature preservation is maintained, thereby improving the high-temperature preservation of a secondary battery.

Also, if an electrolyte solution is left for a period after it is prepared, the amount of moisture and HF therein increases to reduce the discharging capacity of a battery. However, the use of the pyrimidine-based compound can inhibit the variation of the amount of moisture and HF by the reaction of a nitrogen atom present in the pyrimidine-based compound with HF, thereby preventing the discharging capacity of a battery from being reduced.

Figure 1:
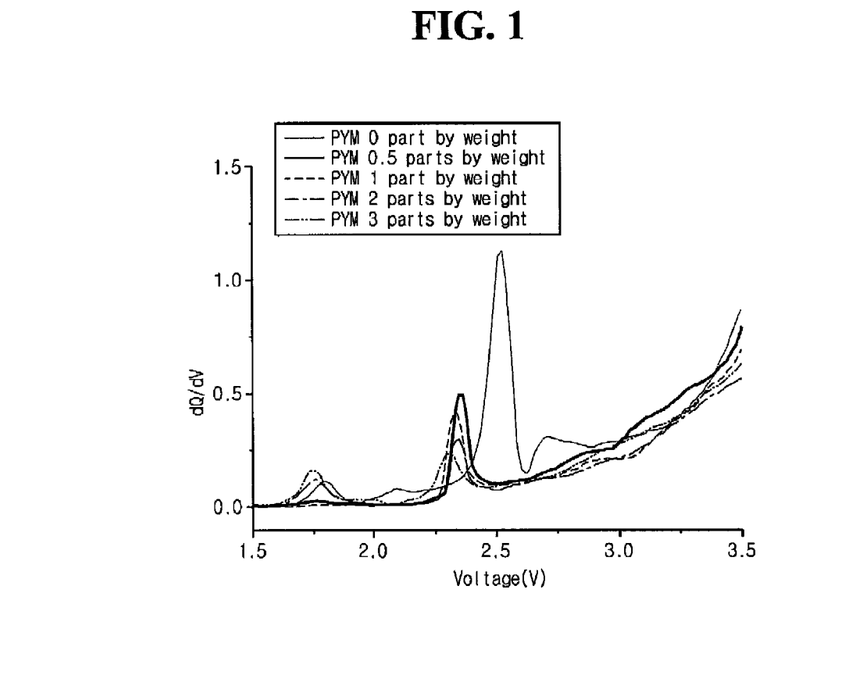
FIG. 1 shows dQ/dV curves over initial charging voltages of batteries wherein the amount of pyrimidine used in each battery is varied.

Meanwhile, referring to FIG. 1, it can be confirmed that the pyrimidine-based compound first reacts with an anode prior to the fluorinated solvent to form a stable film on the surface of the anode. For reference, each secondary battery to be tested was prepared by obtaining electrodes of a cathode made of $LiCoO_2$ and an anode made of nature graphite; and introducing in the electrodes each non-aqueous electrolyte solution comprising a fluorinated solvent and a non-fluorinated solvent, specifically obtained by mixing fluoroethylene carbonate (FEC), propylene carbonate (PC) and ethyl methyl carbonate (EMC) in a ratio of 3:1:6 (vol %) as an organic solvent, adding thereto each pyrimidine (PYM) in an amount of 0, 0.5, 1, 2 or 3 parts by weight, and 1,3-propane sultone in an amount of 2 parts by weight, based on 100 parts by weight of the organic solvent, and dissolving $LiPF_6$ therein until 1M $LiPF_6$ solution was obtained.

Specifically, FIG. 1 shows dQ/dV curves over initial charging voltages of each battery wherein a different amount of a pyrimidine (PYM) is each used relative to a certain amount of the fluorinated solvent. As the amount of the pyrimidine increases, the height of peaks increases at an area around 1.8V while the height of peaks decreases at an area around 2.4V. The peaks at an area around 1.8V are due to the pyrimidine, which means that the pyrimidine first forms a stable film prior to the fluorinated solvent in an anode.

Accordingly, the organic solvent used in the non-aqueous electrolyte solution according to one aspect of the present invention comprises a fluorinated solvent and a non-fluorinated solvent.

The amount of fluorine (F) present in the organic solvent is in the range of 0.1 to 50 wt %, preferably 0.5 to 40 wt %, more preferably 3 to 30 wt %.

When the amount of fluorine satisfies the above range, the fluorinated solvent may be maintained in a constant amount without the exhaustion thereof for a long-term cycle progress, a rise on the cost of a battery may be controlled, battery performances may be prevented from being deteriorated during a high-rate discharging due to an excessive increase in the resistance of a cathode, and the electrolyte solution may be uniformly penetrated into electrodes after being introduced.

The fluorinated solvent may be any one which is conventionally used in an electrolyte solution for a lithium secondary battery, for example, a fluorine-containing aromatic solvent, a fluorine-containing cyclic carbonate solvent, a fluorine-containing linear carbonate solvent, a fluorine-containing ester solvent, a fluorine-containing ether solvent, a fluorine-containing nitrile solvent, a fluorine-containing sulfur-based solvent or a mixture thereof.

Specific examples of the fluorine-containing aromatic solvent include fluorobenzene, 1,2-difluorobenzene, 1,2,3-trifluorobenzene, 1,2,3,4-tetrafluorobenzene, pentafluorobenzene, hexafluorobenzene, 2-fluorotoluene, $\alpha,\alpha,\alpha$-trifluorotoluene, 3-fluorotoluene, 4-fluorotoluene, 2,3-difluorotoluene, 2,4-difluorotoluene, 2,5-difluorotoluene, 3-fluoro-o-xylene, 4-fluoro-o-xylene, 2-fluoro-m-xylene, 4-fluoro-m-xylene, 2-fluoro-p-xylene and a mixture thereof.

Specific examples of the fluorine-containing cyclic carbonate solvent include fluoroethylene carbonate, difluoroethylene carbonate, trifluoroethylene carbonate, tetrafluoroethylene carbonate, 3,3,3-trifluoropropylene carbonate, 1-fluoropropylene carbonate and a mixture thereof, but is not limited thereto.

Specific examples of the fluorine-containing linear carbonate solvent include di-(2,2,2-trifluoroethyl) carbonate, 2,2,2-trifluoroethylmethyl carbonate, fluoromethylmethyl carbonate, difluoromethylmethyl carbonate, trifluoromethylmethyl carbonate, fluoromethylethyl carbonate, difluoromethylethyl carbonate, trifluoromethylethyl carbonate, 1-fluoroethylmethyl carbonate and a mixture thereof, but is not limited thereto.

Specific examples of the fluorine-containing ester solvent include $\alpha$-fluoro-$\gamma$-butyrolactone, $\beta$-fluoro-$\gamma$-butyrolactone, $\alpha,\alpha$-difluoro-$\gamma$-butyrolactone, $\beta,\beta$-difluoro-$\gamma$-butyrolactone, $\alpha$-fluoro-$\gamma$-valerolactone, $\beta$-fluoro-$\gamma$-valerolactone, $\alpha,\alpha$-difluoro-$\gamma$-valerolactone, $\alpha$-fluoro-$\delta$-valerolactone, $\beta$-fluoro-$\delta$-valerolactone and a mixture thereof, but is not limited thereto.

The non-fluorinated solvent may be any one which is conventionally used in an electrolyte solution for a lithium secondary battery, for example, an ether, an ester, an amide, a linear carbonate, a cyclic carbonate or a mixture thereof.

Among these, a linear carbonate, a cyclic carbonate, or a mixture thereof is representatively used.

Specific examples of the cyclic carbonate compound include ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, a halide thereof and a mixture thereof, with the proviso that a fluoride is excluded from the halide.

Specific examples of the linear carbonate compound include dimethyl carbonate (DMC), diethyl carbonate (DEC), dipropyl carbonate, ethyl methyl carbonate (EMC), methyl propyl carbonate, ethyl propyl carbonate and a mixture thereof, but is not limited thereto.

In particular, among the above carbonate-based organic solvents, the cyclic carbonates such as ethylene carbonate and propylene carbonate have a high viscosity and a high dielectric constant to more easily dissociate a lithium salt in an electrolyte. Such a cyclic carbonate may be mixed with a linear carbonate with low viscosity and low dielectric constant such as dimethyl carbonate and diethyl carbonate in a suitable ratio to provide an electrolyte solution with a high electric conductivity.

Also, the ether which may be used as the organic solvent is selected from the group consisting of dimethyl ether, diethyl ether, dipropyl ether, methyl ethyl ether, methyl propyl ether, ethyl propyl ether and a mixture thereof, but is not limited thereto.

In addition, the ester which may be used as the organic solvent is selected from the group consisting of methyl acetate, ethyl acetate, propyl acetate, methyl propionate, ethyl propionate, isobutyl propionate, isoamyl propionate, isobutyl butylate, ethyl 2-methylbutylate, ethyl isovalerate, ethyl isobutylate, methyl 2-methylbutylate, methyl isovalerate, methyl isobutylate, propyl 2-methylbutylate, propyl isovalerate, propyl isobutylate, $\gamma$-butyrolactone, $\gamma$-valerolactone, $\gamma$-caprolactone, $\sigma$-valerolactone, $\epsilon$-caprolactone and a mixture thereof, but is not limited thereto.

The amount of the fluorinated solvent is in the range of 5 to 95 vol %, preferably 10 to 80 vol %, more preferably 20 to 70 vol %, based on the total volume of the organic solvent.

When the amount of the fluorinated solvent satisfies the above range, the fluorinated solvent may be maintained in a constant amount without the exhaustion thereof for a long-term cycle progress, a rise on the cost of a battery may be controlled, battery performances may be prevented from being deteriorated during a high-rate discharging due to an excessive increase in the resistance of a cathode, and the electrolyte solution may be uniformly penetrated into electrodes after being introduced.

The amount of the pyrimidine-based compound is in the range of 0.1 to 20 parts by weight, preferably 0.1 to 10 parts by weight, more preferably 0.5 to 5 parts by weight, based on 100 parts by weight of the organic solvent. When the amount of the pyrimidine-based compound satisfies the above range, high-temperature performances may be sufficiently improved and the viscosity of the electrolyte solution may not excessively increase, thereby improving performances at room temperature and a high temperature, and battery performances may be prevented from being deteriorated during a high-rate discharging due to an excessive increase in the resistance of a cathode.

The pyrimidine-based compound may be, for example, at least one selected from the group consisting of pyrimidine, 2-methylpyrimidine, 4-methylpyrimidine, 5-methyl pyrimidine, 4,6-dimethylpyrimidine, 4.6-dimethoxy pyrimidine, 2-ethyl pyrimidine, 4-ethyl pyrimidine, 5-ethyl pyrimidine, 4,6-diethyl pyrimidine, 2-methoxy pyrimidine, 4-methoxy pyrimidine, 5-methoxy pyrimidine, 2-ethoxy pyrimidine, 4-ethoxy pyrimidine and 5-ethoxy pyrimidine, but is not limited thereto.

The non-aqueous electrolyte solution comprises a lithium salt as an electrolyte salt. The lithium salt may be any one which is conventionally used in an electrolyte solution for a lithium secondary battery. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

The non-aqueous electrolyte solution for a lithium secondary battery according to the present invention may further comprise an SEI layer-forming additive within a range which does not deviate from the object of the present invention. The SEI layer-forming additive which may be used in the present invention includes a cyclic sulfite, a saturated sultone, an unsaturated sultone, a non-cyclic sulfone and a mixture thereof, but is not limited thereto. Among the cyclic carbonates mentioned above, vinylene carbonate and vinyl ethylene carbonate may also be used as the SEI layer-forming additive to improve the life of a battery.

Examples of the cyclic sulfite include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite and 1,3-butylene glycol sulfite; examples of the saturated sultone include 1,3-propane sultone and 1,4-butane sultone; examples of the unsaturated sultone include ethene sultone, 1,3-propene sultone, 1,4-butene sultone and 1-methyl-1,3-propene sultone; and examples of the non-cyclic sulfone include divinyl sulfone, dimethyl sulfone, diethyl sulfone, methyl ethyl sulfone and methyl vinyl sulfone.

The SEI layer-forming additive may be used in a suitable amount depending on its specific type, for example, in an amount of 0.01 to 10 parts by weights based on 100 parts by weight of the non-aqueous electrolyte solution.

Even if the pyrimidine-based compound forms a stable film on the anode, a solid may be formed by the addition of the additives to lower a performance-improvement effect due to the formation of the stable film.

In this regard, among the additives as mentioned above, the cyclic sulfite or unsaturated sultone, in particular, ethylene sulfite or 1,3-propene sultone is preferably used since they have a low reactivity with the pyrimidine-based compound to not form a solid, thereby being capable of increasing the above-mentioned synergetic effect due to the combination of the fluorinated solvent and the pyrimidine-based compound.

The non-aqueous electrolyte solution may be instantly used as a liquid electrolyte or immersed in a polymer and then used in the form of a gel polymer electrolyte in a lithium secondary battery.

The non-aqueous electrolyte solution according to one aspect of the present invention may be prepared by mixing the electrolyte salt with the fluorinated solvent and the non-fluorinated solvent, and dissolving a pyrimidine-based compound of formula (I) therein.

At this time, the compounds being added to the electrolyte solution, the fluorinated solvent and the non-fluorinated solvent are subject to pre-purification before using within a range which will not substantially deteriorate productivity, so as to have little or no impurity.

In the non-aqueous electrolyte solution, air or carbon dioxide may be added to improve battery characteristics including the inhibition of gas generation by electrolyte solution decomposition, cycle characteristics over a long period and charging-preservation characteristics.

In order to improve charging/discharging characteristics, carbon dioxide may be used by dissolving in the non-aqueous electrolyte solution. The carbon dioxide may be dissolved in an amount of 0.001 wt % or more, preferably 0.05 wt % or more, more preferably 0.2 wt % or more, most preferably until the carbon dioxide is saturated in the non-aqueous electrolyte solution.

Further, in accordance with the present invention, there is provided a lithium secondary battery comprising an electrode assembly consisting of a cathode, an anode and a separator interposed therebetween, and a non-aqueous electrolyte solution introduced in the electrode assembly, wherein the non-aqueous electrolyte solution is the above-mentioned non-aqueous electrolyte solution for a lithium secondary battery.

The cathode, anode and separator composing the electrode assembly may be any one which is conventionally used in the preparation of a lithium secondary battery.

The cathode has a structure wherein a cathode layer comprising a cathode active material, a conductive material and a binder is immersed in one side or both sides of a current collector.

As the cathode active material, a lithium-containing transition metal oxide may be preferably used, for example, any one selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<y<1$), $Li_xCo_{1-y}Mn_yO_2$ ($0.5<x<1.3$, $0\le y<1$), $Li_xNi_{1-y}Mn_yO_2$ ($0.5<X<1.3$, $O\le y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<z<2$), $Li_xMn_{2-z}CO_zO_4$ ($0.5<x<1.3$, $0<z<2$), $Li_xCoPO_4$ ($0.5<x<1.3$), $LixFePO_4$ ($0.5<x<1.3$) and a mixture thereof may be used.

The lithium-containing transition metal oxide may be coated with a metal such as aluminum (Al) and a metal oxide. In addition, lithium-containing transition metal sulfide, selenide, or halide may also be used.

As the conductive material, any electron-conductive material is not particularly limited if it does not cause a chemical change in an electrochemical device. Generally, carbon black, graphite, carbon fiber, carbon nanotube, metal powders, a conductive metal oxide and an organic conductive material may be used. Examples of a commercially available conductive material include acetylene black-based products (Chevron Chemical Company or Gulf Oil Company), Ketjen Black EC-based products (Armak Company, Vulcan XC-72 (Cabot Company) and Super P (MMM Carbon Company). For example, acetylene black, carbon black and graphite may be used.

The anode has a structure wherein an anode layer comprising an anode active material and a binder is immersed in one side or both sides of a current collector.

As the anode active material, a carbon-based material, lithium metal, a metal compound or a mixture thereof which can conventionally intercalate and disintercalate lithium ions may be used.

Specifically, the carbon-based material may be low-crystalline carbon or high-crystalline carbon. Representative examples of the low-crystalline carbon include soft carbon and hard carbon, and representative examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes.

The metal compound may be a compound containing at least one metal selected from Si, Ge, Sn, Pb, P, Sb, Bi, Al, Ga, In, Ti, Mn, Fe, Co, Ni, Cu, Zn, Ag, Mg, Sr and Ba. Such a metal compound may be used in the form of a combination, an alloy, an oxide (e.g., $TiO_2$ and $SnO_2$), a nitride, a sulfide, a boride, an alloy with lithium and any other form, and among these, forms such as a combination, an alloy, an oxide and an alloy with lithium can provide the high capacity of a battery. In particular, a compound containing at least one metal selected from Si, Ge and Sn, preferably Si and Sn can provide even higher capacity of a battery.

The binder used in the cathode and anode functions to maintain cathode and anode active materials in a current collector and connect active materials with each other, and may be any one which is conventionally used.

For example, various kinds of binder polymers including vinylidene fluoride-hexafluoropropylene copolymer (PVDF-co-HFP), polyvinylidene fluoride, polyacrylonitrile, polymethylmethacrylate, styrene butadiene rubber (SBR) and carboxymethyl cellulose (CMC) may be used.

The current collector used in the cathode and anode may be made of any high conductive metal as long as a slurry of the active material can easily adhere and has no reactivity within the voltage range of a battery. Specifically, non-limiting examples of a cathode current collector include aluminum foils, nickel foils and a combination thereof, and non-limiting examples of an anode current collector include copper foils, gold foils, nickel foils, copper alloy foils and a combination thereof. The current collector may be used in a laminated form of substrates made of such materials.

Each of the cathode and anode may be prepared by mixing an active material, a binder and a solvent having a high boiling point to form an electrode composite and applying the composite on the copper foil of a current collector, followed by drying, pressing and then heat-treatment at a temperature of 50 to 250° C. under vacuum for 2 hours.

Also, the cathode has a layer thickness (per one side of a current collector) of 30 to 120 μm, preferably 50 to 100 μm, and the anode has a layer thickness of 1 to 100 μm, preferably 3 to 70 μm. When the cathode and the anode satisfies such a thickness range, a sufficient amount of an active material is provided in the layer of an electrode material to prevent a battery capacity from being lowered and improve cycle and rate characteristics.

The separator may be obtained from a porous polymer film which is conventionally used alone or in the form of lamination in conventional separators, for example, porous polymer films made of polyolefin-based polymers such as ethylene homopolymer, propylene homopolymer, ethylene/butene copolymer, ethylene/hexene copolymer and ethylene/methacrylate copolymer. Also, as the separator, conventional porous non-woven fabrics such as a non-woven fabric made of glass fiber having a high melt point or polyethylene terephthalate fiber may be used, but is not limited thereto.

The lithium secondary battery of the present invention is not limited to its shape, but may be a cylindrical shape using a can, an angled shape, a pouch shape or a coin shape.

Hereinafter, the present invention will be explained in more detail with reference to the following Examples. However, it should be understood that the Examples are provided for the purpose of illustrations only and to better explain to a person having ordinary skill in the art, and is not intended to limit the scope of the present invention, so other equivalents and modifications could be made thereto without departing from the spirit and scope of the present invention.

Preparation of Non-Aqueous Electrolyte Solution

Example 1-1

Fluoroethylene carbonate (FEC), ethylene carbonate (EC) and methyl propionate (MP) were mixed in a volume ratio of 30:5:65 (vol %) to obtain an organic solvent mixture, wherein the amount of fluorine present in the organic solvent mixture was 5.4 wt %.

Thereto, 1 part by weight of pyrimidine and 3 parts by weight of 1,3-propane sultone were added based on 100 parts by weight of the mixture, and $LiPF_6$ was dissolved therein until 1M $LiPF_6$ solution was obtained, to prepare a non-aqueous electrolyte solution.

Example 1-2

The procedure of Example 1-1 was repeated except that fluoroethylene carbonate (FEC), ethylene carbonate (EC) and methyl propionate (MP) were mixed in a volume ratio of 20:15:65 (vol %), and the amount of fluorine present in the organic solvent mixture was 3.6 wt %, to prepare a non-aqueous electrolyte solution.

Example 1-3

The procedure of Example 1-1 was repeated except that fluoroethylene carbonate (FEC), ethylene carbonate (EC) and methyl propionate (MP) were mixed in a volume ratio of 10:25:65 (vol %), and the amount of fluorine present in the organic solvent mixture was 1.8 wt %, to prepare a non-aqueous electrolyte solution.

Example 1-4

The procedure of Example 1-1 was repeated except that fluoroethylene carbonate (FEC), ethylene carbonate (EC) and methyl propionate (MP) were mixed in a volume ratio of 5:30:65 (vol %), and the amount of fluorine present in the organic solvent mixture was 0.9 wt %, to prepare a non-aqueous electrolyte solution.

Example 1-5

The procedure of Example 1-1 was repeated except that fluoroethylene carbonate (FEC), ethylene carbonate (EC), 2-(trifluoromethyl)-3-ethoxydodecafluorohexane (HFE) and methyl propionate (MP) were mixed in a volume ratio of 30:5:30:35 (vol %) to obtain an organic solvent mixture, and the amount of fluorine present in the organic solvent mixture was 26.4 wt %, to prepare a non-aqueous electrolyte solution.

Example 1-6

The procedure of Example 1-1 was repeated except that fluoroethylene carbonate (FEC), ethylene carbonate (EC), 2-(trifluoromethyl)-3-ethoxydodecafluorohexane (HFE) and ethyl heptafluorobutyrate were mixed in a volume ratio of 30:5:30:35 (vol %) to obtain an organic solvent mixture, and the amount of fluorine present in the organic solvent mixture was 45.2 wt %, to prepare a non-aqueous electrolyte solution.

Comparative Example 1-1

The procedure of Example 1-1 was repeated except that ethylene carbonate (EC) and methyl propionate (MP) were mixed in a volume ratio of 35:65 (vol %) to obtain an organic solvent mixture, and the amount of fluorine present in the organic solvent mixture was 0 wt %, to prepare a non-aqueous electrolyte solution.

Comparative Example 1-2

The procedure of Example 1-1 was repeated except that fluoroethylene carbonate (FEC) and 3-methoxyperfluoro-(2-methyl pentane) were mixed in a volume ratio of 30:70 (vol %) to obtain an organic solvent mixture, and the amount of fluorine present in the organic solvent mixture was 54.8 wt %, to prepare a non-aqueous electrolyte solution. In this case, the polarity difference between two solvents used is very severe, and thus the resulting electrolyte solution is not uniform and is separated into two layers, which may not be applied in a lithium secondary battery.

Comparative Example 1-3

The procedure of Example 1-1 was repeated except that pyrazine was used instead of pyrimidine, to prepare a non-aqueous electrolyte solution.

Comparative Example 1-4

The procedure of Example 1-1 was repeated except that pyridazine was used instead of pyrimidine, to prepare a non-aqueous electrolyte solution.

Comparative Example 1-5

The procedure of Example 1-1 was repeated except that imidazole was used instead of pyrimidine, to prepare a non-aqueous electrolyte solution.

Comparative Example 1-6

The procedure of Example 1-1 was repeated except that fluoroethylene carbonate (FEC), ethylene carbonate (EC), 2-(trifluoromethyl)-3-ethoxydodecafluorohexane (HFE) and ethyl heptafluorobutyrate were mixed in a volume ratio of 10:5:30:55 (vol %) to obtain an organic solvent mixture, and the amount of fluorine present in the organic solvent mixture was 52.6 wt %, to prepare a non-aqueous electrolyte solution.

Preparation of Lithium Secondary Battery

Example 2-1

$LiCoO_2$ as a cathode and natural graphite as an anode were used to obtain electrodes, in which the non-aqueous electrolyte solution prepared in Example 1-1 was introduced, according to a conventional method known in the art, to prepare a cylindrical-shaped lithium secondary battery.

Example 2-2

The procedure of Example 2-1 was repeated except that the non-aqueous electrolyte solution prepared in Example 1-2 was used, to prepare a cylindrical-shaped lithium secondary battery.

Example 2-3

The procedure of Example 2-1 was repeated except that the non-aqueous electrolyte solution prepared in Example 1-3 was used, to prepare a cylindrical-shaped lithium secondary battery.

Example 2-4

The procedure of Example 2-1 was repeated except that the non-aqueous electrolyte solution prepared in Example 1-4 was used, to prepare a cylindrical-shaped lithium secondary battery.

Example 2-5

The procedure of Example 2-1 was repeated except that the non-aqueous electrolyte solution prepared in Example 1-5 was used, to prepare a cylindrical-shaped lithium secondary battery.

Example 2-6

The procedure of Example 2-1 was repeated except that the non-aqueous electrolyte solution prepared in Example 1-6 was used, to prepare a cylindrical-shaped lithium secondary battery.

Example 2-7

$LiCoO_2$ as a cathode and natural graphite as an anode were used to obtain electrodes, in which the non-aqueous electrolyte solution prepared in Example 1-1 was introduced, according to a conventional method known in the art, to prepare a coin-shaped lithium secondary battery.

Comparative Example 2-1

The procedure of Example 2-1 was repeated except that the non-aqueous electrolyte solution prepared in Comparative Example 1-1 was used, to prepare a cylindrical-shaped lithium secondary battery.

Comparative Example 2-2

The procedure of Example 2-7 was repeated except that the non-aqueous electrolyte solution prepared in Comparative Example 1-3 was used, to prepare a coin-shaped lithium secondary battery.

Comparative Example 2-3

The procedure of Example 2-7 was repeated except that the non-aqueous electrolyte solution prepared in Comparative Example 1-4 was used, to prepare a coin-shaped lithium secondary battery.

Comparative Example 2-4

The procedure of Example 2-7 was repeated except that the non-aqueous electrolyte solution prepared in Comparative Example 1-5 was used, to prepare a coin-shaped lithium secondary battery.

Comparative Example 2-5

The procedure of Example 2-1 was repeated except that the non-aqueous electrolyte solution prepared in Comparative Example 1-6 was used, to prepare a cylindrical-shaped lithium secondary battery.

Evaluation of Lithium Secondary Battery Characteristics
Life Characteristics at a High Temperature (1)

Cylindrical-shaped lithium secondary batteries (Capacity: 3,000 mAh) prepared in Examples 2-1 to 2-6 and Comparative Examples 2-1 and 2-5 were charged at 55° C. with a constant current of 0.7 C up to 4.35 V and then with a constant voltage of 4.35 V, and the charging process was completed when the charging current reached 150 mA. After left for 10 minutes, the batteries were discharged with a constant current of 0.5 C up to 3.0 V. The charging/discharging was repeated 200 times under the same conditions, and then the capacity of the batteries were measured and shown in FIG. 2. The unit "C" which is used herein refers to a charging/discharging current rate (C-rate) of a battery, represented by ampere (A), and is usually expressed by a percentage of the battery capacity. Accordingly, "1C" of the batteries prepared above means a current of 3 A.

Life Characteristics at a High Temperature (2)

Coin-shaped lithium secondary batteries (Capacity: 5.5 mAh) prepared in Example 2-7 and Comparative Examples 2-2 to 2-4 were charged at 60° C. with a constant current of 1.0 C up to 4.35 VA and then with a constant voltage of 4.35 V, and the charging process was completed when the charging current reached 0.275 mA. After left for 10 minutes, the batteries were discharged with a constant current of 1.0 C up to 3.0 V. The charging/discharging was repeated 100 times under the same conditions, and then the capacity of the batteries were measured and shown in FIG. 3. The unit "C" which is used herein refers to a charging/discharging current rate (C-rate) of a battery, represented by ampere (A), and is usually expressed by a percentage of the battery capacity. Accordingly, "1C" of the batteries prepared above means a current of 5.5 mA.

Figure 2:
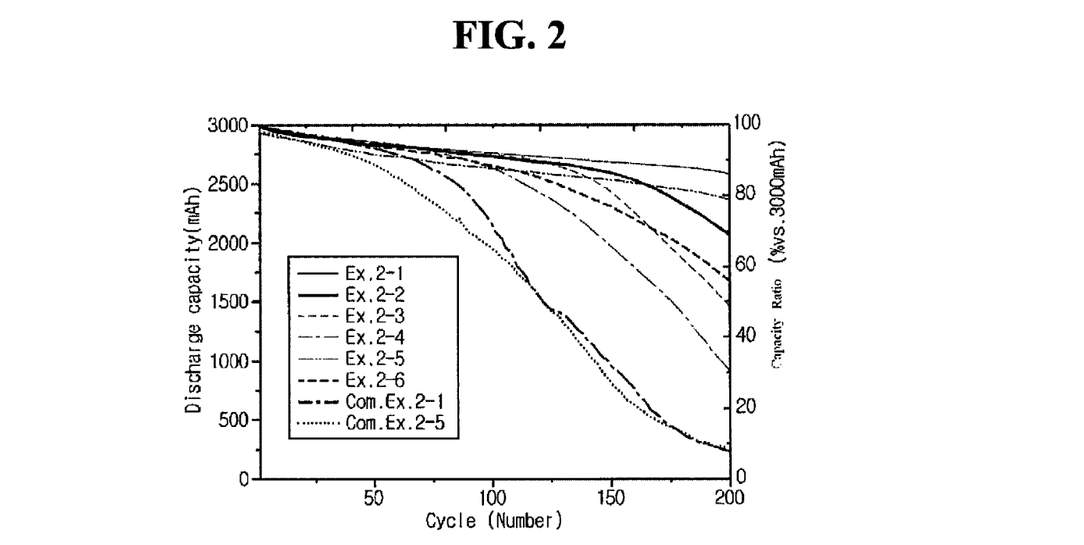
FIG. 2 shows the high-temperature life characteristics of lithium batteries prepared in Examples 2-1 to 2-6 and Comparative Examples 2-1 and 2-5.

As can be seen from FIG. 2, lithium secondary batteries having the electrolyte solution comprising a pyrimidine-based compound together with fluoroethylene carbonate as a fluorinated solvent exhibit superior life characteristics at a high temperature, as compared to lithium secondary batteries having the electrolyte solution comprising only ethylene carbonate and methyl propionate as a non-fluorinated solvent, without a fluorinated solvent, or the electrolyte solution wherein the amount of fluorine present in the organic solvent is greater than 50 wt %.

Figure 3:
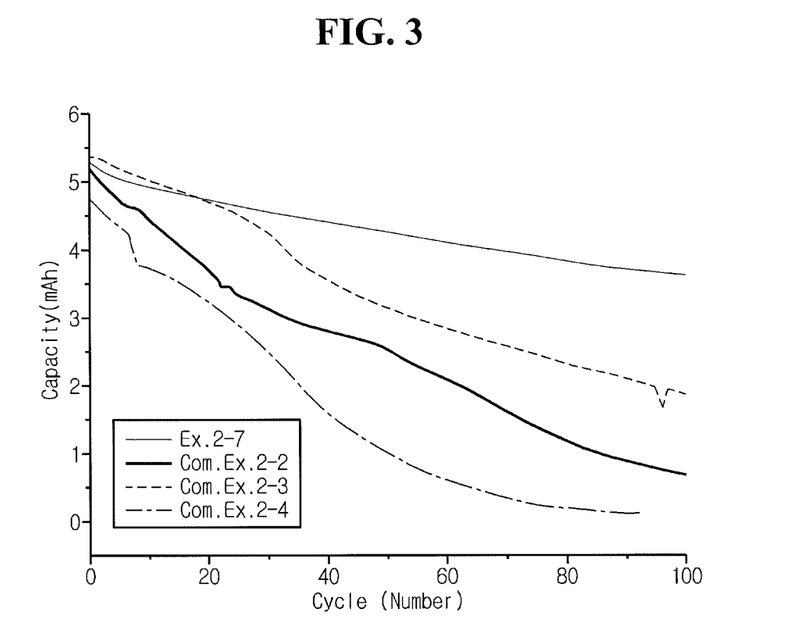
FIG. 3 shows the high-temperature life characteristics of lithium batteries prepared in Example 2-7 and Comparative Examples 2-2 to 2-4.

Also, as can be seen from FIG. 3, among nitrogen-containing compounds, a pyrimidine-based compound has a superior capability of improving life characteristics, which is deemed to result from the arrangement of nitrogen atoms in suitable positions within the pyrimidine-based compound, thereby allowing the formation of a suitable SEI layer.

What is claimed is:

1. A lithium secondary battery, comprising:
   an electrolyte assembly comprising a cathode, an anode, and a separator interposed therebetween; and
   a non-aqueous electrolyte solution consisting of an electrolyte salt, an organic solvent, a sulfur-containing compound, and pyrimidine,
   wherein the organic solvent consists of a non-fluorinated solvent and a fluorinated solvent, wherein the amount of fluorine (F) present in the organic solvent is in the range of 0.9 to 45.2 wt %,
   wherein the non-fluorinated solvent includes a mixture of cyclic carbonate and an ester,
   wherein the ester is selected from the group consisting of methyl propionate, ethyl propionate, and a mixture thereof,
   wherein the cyclic carbonate is selected from the group consisting of ethylene carbonate, propylene carbonate, and mixtures thereof,
   wherein the fluorinated solvent includes fluoroethylene carbonate and optionally at least one selected from the group consisting of 2-(trifluoromethyl)-3-ethoxydodecafluorohexane, ethyl heptafluorobutyrate, and mixtures thereof,
   wherein the sulfur-containing compound is 1,3 propane sultone,
   wherein the sulfur-containing compound is present in an amount of 0.5 to 3 parts by weight based on 100 parts of the organic solvent, wherein the anode comprises a carbon-based material as an active material; and
   a polymerizable film present on a surface of the anode, wherein the polymerizable film is formed by a reaction of the pyrimidine with the anode,
   wherein the pyrimidine is present in an amount of 0.5 to 3 parts by weight based on 100 parts of the organic solvent prior to formation of the polymerizable film.

2. The lithium secondary battery according to claim 1, wherein the electrolyte salt is a lithium salt.

3. The lithium secondary battery according to claim 2, wherein the lithium salt has an anion selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_2)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCH^-$ and $(CF_3CF_2SO_2)_2N^-$.

4. The lithium secondary battery according to claim 1, wherein the cathode has a cathode layer comprising a lithium-containing oxide.

5. The lithium secondary battery according to claim 4, wherein the lithium-containing oxide is a lithium-containing transition metal oxide.

6. The lithium secondary battery according to claim 5, wherein the lithium-containing transition metal oxide is selected from the group consisting of $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0<y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$, $LiFePO_4$ and a mixture thereof.